United States Patent Office 3,096,365
Patented July 2, 1963

3,096,365
PREPARATION OF ESTERS FROM OLEFINS
Robert Y. Heisler, Fishkill, Howard V. Hess, Glenham, George W. Eckert, Wappingers Falls, and Morford C. Throckmorton, Beacon, N.Y., assignors to Texaco, Inc., a corporation of Delaware
No Drawing. Filed Mar. 24, 1959, Ser. No. 801,434
17 Claims. (Cl. 260—497)

The instant invention relates to a process for the preparation of carboxylic acid esters of tertiary alcohols, and more particularly to such process where a "tertiary base" or, more simply put, a "tertiary" olefinic compound, is reacted in an esterification zone with a carboxylic acid in a liquid phase reaction mixture using heterogeneous catalysis.

Using, for example, acetic acid and the hydrocarbon, isobutylene, the reaction can be represented as follows:

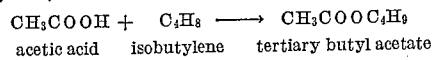
$$CH_3COOH + C_4H_8 \longrightarrow CH_3COOC_4H_9$$
acetic acid    isobutylene    tertiary butyl acetate Such ester is useful as a paint solvent and as a grease component. As a group, these esters are solvents for many organic materials, thus useful as vehicles therefor.

The condensation of a tertiary olefinic compound with a carboxylic acid is usually done in the presence of a conventional condensing catalyst, e.g., sulfuric acid, various complexes of boron trifluoride, orthophosphoric acid suitably supported on an inert support such as kieselguhr, benzene sulfonic acid, alkyl sulfates, or other strong mineral or organic acid. Such catalyst is present as a distinct liquid phase in the esterification reaction mixture, or is homogeneous therewith, or is sorbed on a solid porous carrier such as silica, charcoal, or alumina.

There is a serious competing reaction here, namely that of polymer formation from the tertiary olefinic material. The esterification reaction involving such tertiary olefins is far more sensitive to polymer competition than is the corresponding reaction involving a secondary olefin or a primary olefin. Actually, when secondary olefins such as butene-2 are condensed with carboxylic acids, it is conventional to rid the hydrocarbon feed of "tertiary" olefins by causing them to polymerize, then to operate with the remaining secondary olefin-containing hydrocarbon feed. By means of our process hydrocarbon streams can be freed of tertiary olefins to make a valuable ester product efficiently, and the so-treated unreacted hydrocarbons separated from the ester for other use.

An advantage of our process over conventional processing of tertiary olefinic compounds for tertiary ester formation is the effective suppressing of the polymerization reaction while esterifying at temperatures from about room temperature up to about 300° F. A further and a very distinct advantage of our process over conventional treatment is the fact that no fugitive strong acidic residue is carried out of the reaction zone with the product (e.g. by dissolution therein), and, accordingly, the crude product need not be treated carefully or extensively for catalyst removal. Distilling or otherwise heat treating the crude ester product in the presence of strong (and fugitive) acids such as sulfuric acid, phosphoric acid, sulfonic, hydrofluoric, or the like, even in the presence of extremely small amounts of such acid, usually results in extensive rapid breakdown of the ester product. This, of course, makes the removal of such acidic traces a necessity. A further advantage of our process is the long catalyst life possible, and the ability of the catalyst to withstand repetitive regeneration without significant impairment of the catalytic properties.

In the process for condensing a tertiary olefinic compound with a carboxylic acid to form the corresponding ester in the esterification zone our improvement comprises: contacting said reactants in the liquid phase at a temperature not substantially above about 300° F. and in the presence of a Period 3 polyvalent metal silicate catalyst, that is, a magnesium silicate or an aluminum silicate catalyst, or mixtures of same. It also is intended to embrace the use of the so-called "silica-alumina" and "silica-magnesia" synthetic cracking catalysts. No fugitive acidic material is present on or in our catalyst, and the term "silicate catalyst" is intended herein to connote this fact.

The proportion of Period 3 polyvalent metal in the silicate catalyst is quite important to the most efficient operation. Broadly, our superior catalysts assay from about 10 to 40 weight percent of the Period 3 metal oxide although it appears that a somewhat larger fraction of the Period 3 metal oxide can be tolerated in a particular catalyst. However, when the Period 3 polyvalent metal oxide assay predominates over the silica assay, we have found that the resulting catalyst is substantially less suitable for our purpose than one with lower Period 3 metal oxide content, e.g. 67% $Al_2O_3$ and 33% $SiO_2$ is inferior to 25% $Al_2O_3$ and 75% $SiO_2$. For efficiency and economy the weight ratio of Period 3 polyvalent metal oxide to silica in the assay of the catalyst should be lower than about 1:1.

Conventional synthetic silica-alumina catalysts useful for our operation contain ordinarily about 9 to about 25% alumina, and conventional synthetic silica-magnesia catalysts available for our operation contain 20 to 30 weight percent magnesia.

On the other hand, the weight ratio of Period 3 polyvalent metal oxide to silica should not be substantially below about 1:20 in the catalyst assay. For example, a silicate catalyst having the equivalent of substantially below about 5% by weight of a Period 3 polyvalent metal oxide is substantially less catalytically active at mild temperature conditions than one having a somewhat greater proportion of the Period 3 polyvalent metal oxide.

It must be pointed out that the catalytic activity here generally increases with increasing temperature, and so does the risk of deleterious polymerization of the tertiary base olefinic compound. We consider that a proportion of more than 10% of polyolefin based on weight of tertiary ester made is excessive and need not be tolerated in our process. Furthermore, the higher the temperature used in the esterification, the greater is the vapor pressure of materials in process (this demanding heavier equipment) and the less favorable is the equilibrium toward the right hand side of the equation. Consequently, the use of a temperature which is as low as is consistent with a reasonable rate of ester formation for a particular Period 3 polyvalent metal silicate catalyst and reactor conformation is dictated in our process to achieve the most efficient conversion of reactants to ester and, therefore, the least recovery and recycle of unreacted raw materials.

We have tested a wide range of other possible solid catalysts, and we have found them to be distinctly inferior to our heterogeneous catalyst for the instant esterification reaction of tertiary olefinic compounds. Thus, porous alumina, or chromia, or cobalt deposited on charcoal, or "Amberlite IR-120" on the acid cycle (a strongly acidic, synthetic, high density, nuclear sulfonic acid ion exchange resin made by the Rohm & Haas Company), or sodium acid sulfate, or titania, titania-silica, or chromia-alumina, or silica-chromia-alumina, or titania-chromia-alumina, or $Fe_2O_3$-silica, or calcium oxide-silica are in this group. Zinc oxide coprecipitated with silica is only feebly active for our purpose. On the other hand, we found that both a silica-alumina cracking catalyst treated with HF and a conventional polymerization catalyst (orthophosphoric acid sorbed on kieselguhr) gave excessive polymerization of the tertiary olefin even though active for esterification under comparatively mild temperature conditions.

The effective catalysts for our operation are acid-type synthetic and naturally-occurring cracking catalysts, clays, selected zeolites, and talc, the natural products ordinarily having been washed with strong mineral leaching acids such as HCl or $H_2SO_4$, then washed with water and calcined at an elevated temperature, e.g. 1000° F. Thus, we have found that conventional synthetic silica-alumina cracking catalysts containing about 9–25% alumina, and preferably 20 to 25% alumina, works excellently, particularly in the temperature range of 100° to 250° F. and advantageously at a temperature of 150–180° F. Typical synthetic catalysts which we have found useful in our synthesis are sold under the trade names "Aerocat AAA," "Aerocat MSB," "Mobil Durabead," "Davison XDA 30," "Houdry S-90," "Houdry S-46," "Davison High Alumina," "Socony Bead," and "Nalcat HA-1." Additionally, we have found that products based on natural clays and other minerals such as products on the market sold under the trade name of "Super Filtrol," "Filtrol 13," "Filtrol SR 81," "Filtrol 100," "Filtrol 63," and "Houdry Kaolin" useful in our synthesis, particularly in the temperature range of 70° to 250° F., and preferably in the range of 100° to 180° F. Other minerals containing silica and alumina and/or magnesia in combination, such as bentonite, halloysite, montmorillonite, "Asbestine" (a magnesium silicate), various zeolites, talc, illite, and Attapulgus clay are also useful, particularly when processed conventionally by acid and water washing and calcining to purify them.

Small amounts of iron oxide, magnesia, titania, and the like present in some natural clay-type catalysts such as a "Super Filtrol" catalyst appear to give such catalyst a somewhat higher initial catalytic activity than we are able to get with a plain, synthetic cracking catalyst. Apparently these minerals promote the activity of the group 3 polyvalent metal silicate present for esterification catalysis by giving a faster reaction rate in the temperature range of 70° to 250° F. and preferably in the range of 100° to 180° F. than is possible with a purer catalyst.

However, we have found that the purer silicate catalyst, synthetic or natural, or the clays or other natural products themselves, can be treated, if desired, by deliberately adding thereto or incorporating therein a refractory oxide material selected from the group consisting of boria, titania, zirconia, hafnia, thoria, iron oxide (and magnesia in the case of silica-alumina catalysts), or mixtures of same. In cases where such deliberate "promotion" is desired at a reasonable cost one can employ between about 0.1 weight percent and about 20 weight percent of the suitable promotional refractory oxide or oxide mixture based on the base catalyst weight. The oxide can be deposited upon or precipitated with the silicate base (and thus made diffuse) in conventional manner.

Our esterification catalyst is capable of operating for as long as 600 hours, and even longer, without a great deal of loss of activity. Eventually, however, the catalyst activity will decline to a point where it pays to consider regenerating it. Thus, for example, after 180–600 hours of operation we have found it convenient to calcine the catalyst in the presence of air for two hours using a temperature of 900° F. This is done most simply in a fixed catalyst bed by blowing hot air through the bed. If desired, to supplement such oxidative regeneration or, in lieu of it, other conventional treatment can be used to remove deposited material, etc.

Our catalyst is capable of repetitive oxidative regeneration without substantial impairment of its catalytic activity; the only important limitations in oxidative regeneration or calcining are that the catalyst is neither sintered nor heated substantially beyond the temperature used in its original preparation. Clay catalyst can be compounded ordinarily from a paste of fine particles with water and, optionally, a conventional pelleting lubricant such as stearic acid, a hydrogenated vegetable fat or the like, then pelleted, or extruded and cut to form pills in conventional manner. The synthetic silica-alumina and silica-magnesia cracking catalysts can be purchased in bead or pill form. We have been able to obtain slightly better performance, for example, with certain pelleted cracking catalyst (bulk density roughly 0.69) than with the same catalyst in extruded form (bulk density roughly 0.65), thus demonstrating that even the method of production can affect the catalyst somewhat.

The pressure for our operation should be sufficient to maintain liquid phase reaction conditions, for example 25–300 p.s.i.g., with pressures in the 75–100 p.s.i.g. range preferred to insure completely liquid phase conditions at modest pressure. As the catalyst is solid, it is convenient to pump the reactants through a fixed bed of the catalyst in a continuous manner, the space velocity for the operation being broadly between 0.1 and 5 liquid volumes of feed per bulk volume of catalyst per hour; the preferred space velocity in the operation is between about 0.25 and 1.5 v./v./hr. In such system the feeds can be fed at a temperature lower than the major portion of the reaction zone, then allowed to react reaction temperature autogenously by the exothermic heat of reaction. Alternatively indirect reactor coling or heating can be used.

Alternatively, also, the catalyst can be maintained in suspension in the reaction mixture, suitably by passing fresh reactant and catalyst particle feeds and a product recycle flow of reactor output into the reactor inlet to maintain catalyst suspension velocity, and withdrawing from the recycle system only the production increment of filtered or unfiltered reaction mixture. This method lends itself to easy temperature control (e.g., by heat transfer on the recycle stream); the catalyst can be withdrawn periodically in a batch or incrementally for regeneration in such system.

Corrosion-resistant reaction vessels are in order, e.g. ones of austenitic stainless steel, high chrome stainless steel and the like because of the possibile corrosive tendencies of the carboxylic acid reactant in process.

Ordinarily we prefer to use an excess of either reactant to drive the esterification reaction toward the right hand side of the equation. Thus, using mono-olefins and monocarboxylic acids, we find it advantageous to use mol ratios of olefin:acid of 1.1–5:1 and preferably 2–4:1, although ratios as high as 10:1 of olefin:acid or even higher can be used if desired. While we use generally an excess of olefin over acid, we have found also that the reverse can be used also; in such instance, during the recovery treatment, the ester product and unreacted olefinic material usually is distilled away to leave a residue of the higher boiling carboxylic acid. Such operation can provide substantial heat economy in recovery processing. Thus, it is in order to use the reverse of the foregoing high olefin: acid mol ratios. Where the acid reactant is dibasic or polybasic, a mol of mono-olefin reactant is needed per carboxyl group for the stoichiometry of the reaction, and the foregoing mol ratios will be adjusted accordingly.

Agitation is vital in our process to achieve contact between the reactants and the catalyst heterogeneous therewith. In the fixed bed operation heretofore described, the catalyst packing acts admirably to establish and maintain distribution and contact of a flow of the reactants. However, other reactor schemes can be used, for example where catalyst, stirred or otherwise maintained in moving contact with the reaction mixture, is used.

Suitable olefinic hydrocarbons for our process start with isobutylene and are, of course, structural isomers rather than stereo-isomers. The useful olefinic starting materials for our process have at least one side chain branching from an olefinic carbon atom (including an olefinic carbon atom in a cyclic structure). Suitable hydrocarbons for use in our process include 2-methyl-1-butene, 2-methyl-2-butene, and 1-methyl-1-cyclohexene. As a practical limitation (because of cost and availability) the aliphatic C$_{4-12}$ tertiary mono-olefinic hydrocarbons are the most desirable for our purpose.

The olefins used can be pure, mixed with each other, or mixed with unreactive or substantially less reactive materials. Thus, for example, we can use pure isobutylene made, for example, by cracking isobutylene dimer. On the other hand, we can use a C$_4$ and/or a C$_5$ cut from a catalytic or a thermal cracking operation, which cut ordinarily will contain somewhat less than 20% of the tertiary olefin and the balance of other diluent hydrocarbons. A typical so-called "B–B" stream from catalytic cracking can contain 10–25 mol percent isobutylene, 50 mol percent paraffins, and the balance preponderantly butene-1 and cis- and trans-butene-2. A suitable stream for making, for example, tertiary butyl carboxylic acid esters is a stream containing about 25 mol percent isobutylene and the balance predominantly normal butane.

In the lower temperature range of our reaction conditions poly-olefins such as 1-4-dimethyl-2-4-hexadiene and even isoprene are conceivable olefinic reactants. Also suitable are oxygenated aliphatic hydrocarbon compounds of tertiary base olefinic carbon configuration, e.g. methacrylates, alkyl vinyl ethers such as methyl or ethyl vinyl ether, and alkyl vinyl ketones such as methyl or ethyl vinyl ketone. Conceivably the tertiary base olefinic compound can be one wherein one or more hydrogen atoms are substituted with an inert substituent such as a halogen (e.g. chlorine), an alkoxy radical, a keto group on a carbon adjacent to the olefinic double bond, a tertiary amino radical, a nitro group, a tertiary phosphate or phosphite radical, or an aromatic radical such as a phenyl group.

The particular carboxylic acid used is dictated by the particular product desired. Because the presence of water in the esterification reactor induces a competing reaction, namely one wherein tertiary alcohols are made, the reactants should be virtually anhydrous for best results to make ester exclusively. However, if the alcohol is desired as a co-product, water can be introduced to the reaction zone. Thus, for example when acetates are being made exclusively, glacial acetic acid (99.5+ percent pure) should be used.

The carboxylic acid reactants can be fatty acids, suitably in the range from formic to stearic and advantageously C$_1$–C$_8$ fatty acids; alternatively, they can be polybasic, e.g. malonic, oxalic, and so on suitably up to sebacic or even higher. They can have inert nuclear substituents for hydrogen atoms (such as keto, nitro, halogen, alkoxy, tertiary phosphate, etc.). They can have an aromatic nucleus such as benzoic, phthalic, toluic, or the like. The reaction can be conducted in the presence of an inert vehicle, e.g. ether, benzene, toluene, or the like. Such technique can be useful for dissolving one or both reactants.

Typical of the carboxylic acids with which we have condensed isobutylene for ester production include the following: acetic, malonic, propionic, butyric, isobutyric, valeric, isovaleric, acetone dicarboxylic, 2-ethyl hexanoic, benzoic, caproic, octanoic, formic, oxalic, monochloroacetic, and cyclohexane carboxylic. We have made also tertiary amyl esters of benzoic and acetic acids by condensing 2-methyl-1-butene and the suitable carboxylic acid. Additionally, we have made 1-ethoxyethyl acetate by condensing ethyl vinyl ether with acetic acid.

The following examples show various ways in which our invention has been practiced but should not be construed as limiting the invention. All percentages given are weight percentages unless otherwise expressly represented. The yield of tertiary alkyl ester is given in mol percent, and it is computed as 100 times the quotient of the quantity of tertiary ester actually produced divided by that amount of the tertiary ester stoichiometrically equivalent to the quantity of carboxylic acid fed.

The apparatus used in all exemplary runs was the following: a reservoir for mixed reactants discharging into a feed pump, which in turn passed the charge mixture into the top of a vertical cylindrical reactor of Type 410 chrome-steel alloy, the top 10½ inches of which was filled with stainless steel balls for heat transfer purposes, the succeeding 20½ inches of which contained the catalyst bed (120 cc. bulk volume), and the bottom 6 inches of which contained stainless steel supporting balls. The inside diameter of the reactor was 0.75 inch.

The exterior of this reactor was equipped with a three-section heating jacket, the top, center, and bottom sections having independent control. Inside, the reactor had a thermocouple probe for measuring temperature within the catalyst bed. The product discharged steadily from the bottom of the reactor through a back pressure control valve. Residual liquid product emptied into a graduated receiver while vaporized light ends were conducted into a cold trap that was refrigerated with Dry Ice. Such non-condensables as were present passed from the cold trap through a conventional wet test meter and were withdrawn from the system.

*Example 1.*—The catalyst used in this preparation was 75 grams of "Aerocat Triple A" high alumina silica-alumina cracking catalyst, a product of the American Cyanamid Company. It contained 25% alumina and was in the form of 5/32" pellets (which in this specification connotes 5/32" diameter right cylinders which are about 5/32" high).

A mixture of 600 grams of glacial acetic acid and 1120 grams of isobutylene, the ratio being one mol of acetic acid to 2 mols of isobutylene, was made up in the reactor charging vessel, and the resulting mixture was pumped into the reactor at a rate of 42 grams per hour against a back pressure of 250 p.s.i.g. The room temperature of mixing was 70° F. and the reactor temperature was allowed to rise autogenously to a slightly higher value. The liquid space velocity in the reactor was 0.5 v./v./hr., i.e. total volume of liquid fed per hour per volume of catalyst. After an initial running-in period a 12 hour onstream period was maintained. The residual liquid product collected in the receiver weighed 239 grams, had 273 cc. volume, and had a refractive index $n_D^{20}$ 1.3753. The condensate collected in the cold trap totaled 118 grams. It analyzed 0.2% butane, 0.5% butene-1, and 99.3% isobutylene.

The residual liquid product was diluted with an equal volume of water, the resulting two layers were separated, the organic layer thus obtained was washed with aqueous sodium hydroxide solution until the washings were distinctly alkaline, then washed with water until the washings were neutral. The organic layer was then dried with anhydrous calcium sulfate and distilled. The distillate was identified as 94% tertiary butyl acetate and 6% diisobutylene. The molal yield of tertiary butyl acetate was 16.7%.

*Example 2.*—A mixture of isobutylene and glacial acetic acid, in the proportion of 2 mols of the hydrocarbon per mol of the acid, was charged to the reactor at a rate of 42 grams per hour. The catalyst used was a silica-alumina cracking catalyst containing 24.3% alumina. It was made up in the form of 5/32" pellets which had been calcined at 1000° F. before use. The catalyst bed was held at 180° F., the back pressure at 250 p.s.i.g., and the operation lasted about 149½ hours. Samples of liquid product were collected periodically. The results of the run are shown in the following table:

| Cumulative Hours Onstream | Yield of t-butyl acetate, percent | Weight Ratio t-butyl acetate to di-isobutylene |
|---|---|---|
| 65½ | 38.4 | 16.9 |
| 101½ | 37.3 | 19.8 |
| 125½ | 37.7 | 24.6 |
| 149½ | 34.8 | 22.2 |

*Example 3.*—A mixture of 2 mols of isobutylene per mol of glacial acetic acid was charged to the reactor at a rate of 42 grams per hour. Reactor conditions were 250 p.s.i.g. pressure and 125° F. temperature in the catalyst bed. The catalyst was 120 ml. (79 grams) of a boria-containing silica-alumina cracking catalyst, the boria being deposited on the surface of the catalyst and the resulting composition being 78% silica, 12% alumina, and 10% boria. The catalyst was in the form of 5/32" pellets which had been calcined at 600° F. prior to use. Results of the run are tabulated below:

| Cumulative Hours Onstream | Yield of t-butyl acetate, percent | Weight Ratio t-butyl acetate to di-isobutylene |
|---|---|---|
| 15½ | 66.9 | 22.9 |
| 30 | 61.3 | 27.4 |
| 42 | 59.5 | 30.1 |

*Example 4.*—In this run the reactants were charged at the same rate and in the same proportions as in Example 1, the hydrocarbon feed being isobutylene and the carboxylic acid feed being glacial acetic acid. The catalyst used was 120 cc. (84 grams) of Superfiltrol Grade 1 (17.0% $Al_2O_3$, 70.9% $SiO_2$, 3.9% $Fe_2O_3$, 3.2% MgO and other oxides) in the form of 5/32" pellets which had been calcined at 1000° F. prior to use. The catalyst bed was held at 125° F. and the reactor pressure at 250 p.s.i.g. Results of the run are tabulated below:

| Cumulative Hours Onstream | Yield of t-butyl acetate, percent | Weight Ratio t-butyl acetate to di-isobutylene |
|---|---|---|
| 39 | 62.1 | 10.7 |
| 51 | 65.7 | 12.8 |
| 63 | 67.7 | 14.8 |
| 75 | 66.0 | 17.1 |

*Example 5.*—In this operation isobutylene and glacial acetic acid were charged as described in Example 1. The catalyst used was 83 grams of "Davison XDA 30" silica-magnesia cracking catalyst containing 25% MgO. It was in the form of 5/32" pellets which had been calcined at 1000° F. before use. The catalyst bed was held at 150° F. and 250 p.s.i.g., and the run lasted 125 hours. Results of the run are tabulated below:

| Cumulative Hours Onstream | Yield of t-butyl acetate, percent | Weight Ratio t-butyl acetate to di-isobutylene |
|---|---|---|
| 15 | 41.7 | 89 |
| 27 | 45.7 | 81.5 |
| 39 | 43.1 | 89 |
| 51 | 42.9 | 89.4 |
| 65 | 50.3 | 81.5 |
| 77 | 47.3 | 89.4 |
| 89 | 46.4 | 89.4 |
| 101 | 47.3 | 80.5 |
| 113 | 48.1 | 89.5 |
| 125 | 50.4 | 82 |

*Example 6.*—Runs were made on catalysts containing titania and thoria, respectively. In both runs shown the catalyst bed temperature was 125° F., mol ratio of isobutylene to glacial acetic acid was 2:1 in the feed mixture. The reactor pressure was 250 p.s.i.g. and the space velocity used was 0.5 v./v./hr. In each case the catalyst was in the form of 5/32" pellets, and the titania and the thoria had been impregnated on the surface of the base Period 3 polyvalent metal oxide silicate pellets.

In the case of the titania-containing catalyst its assay was 83.7% silica, 10% alumina, and 6.3% titania. The molal yield of tertiary butyl acetate based on acetic acid feed was 69%, and the weight ratio of tertiary butyl acetate to di-isobutylene produced was 8.9.

The thoria-containing catalyst assayed 78% silica, 12% alumina, and 10% thoria. The molal yield of tertiary butyl acetate based on acetic acid charged was 73%, and the weight ratio of tertiary butyl acetate to di-isobutylene produced was 6.4.

*Example 7.*—In this run the catalyst used was the same kind as that used in Example 2. The liquid space velocity, feed rate, and feed composition were also the same as those used in Example 2. Reactor pressure was 250 p.s.i.g. and the catalyst bed was maintained at 180° F. Results of the run are tabulated below:

| Cumulative Hours Onstream | Yield of t-butyl acetate, percent | Weight Ratio t-butyl acetate to di-isobutylene |
|---|---|---|
| 53½ | 41.2 | 14.6 |
| 65½ | 38.4 | 16.7 |
| 77½ | 36.9 | 19.0 |
| 89½ | 38.5 | 20.3 |
| 101½ | 37.3 | 19.8 |
| 113½ | 36.0 | 20.3 |
| 125½ | 37.7 | 25.3 |
| 137½ | 33.8 | 24.0 |
| 149½ | 34.8 | 22.3 |
| 180½ | 38.1 | 43.7 |

At this point the catalyst was calcined in air for 2 hours at 900° F., then the run was resumed.

| Cumulative Hours Onstream | Yield of t-butyl acetate, percent | Weight Ratio t-butyl acetate to di-isobutylene |
|---|---|---|
| 196½ | 43.8 | 18.1 |
| 208½ | 43.5 | 29.0 |
| 220½ | 40.9 | 35.8 |
| 232½ | 39.4 | 37.1 |

*Example 8.*—Regeneration of a deliberately-promoted catalyst is shown in the following description. The catalyst use was a synthetic silica-alumina cracking catalyst containing 13.5 alumina, and impregnated on its surface was sufficient boria to give the following assay: 10% $B_2O_3$, 12% $Al_2O_3$, and 78% $SiO_2$. The catalyst was in the form of 5/32" pellets which had been heated to 600° F. for 3 hours before use. The temperature of the catalyst bed was 125° F., pressure 250 p.s.i.g., liquid space velocity 0.5 v./v./hr., and the mol ratio of isobutylene to acetic acid in the feed mixture 2:1. Results of the run are tabulated below.

| Cumulative hours onstream: | Yield of t-butyl acetate, percent |
|---|---|
| 15½ | 66.9 |
| 30 | 61.3 |
| 54 | 53.0 |
| 90 | 41.8 |
| 123 | 25.9 |

At this point the catalyst was calcined in air for 2 hours at 900° F., then the run was resumed.

| Cumulative hours onstream: | Yield of t-butyl acetate, percent |
|---|---|
| 143½ | 60.7 |
| 155½ | 52.8 |
| 179.5 | 39.6 |

*Example 9.*—The product made by practice of our invention, as illustrated in the foregoing examples, can be directly fractionally distilled for recovery of tertiary butyl acetate. The principal materials present in this effluent are the ester product, isobutylene, di-isobutylene, tertiary butyl alcohol, and acetic acid. The table below summarizes the data from a typical fractional distillation of the liquid product from our process using a packed distilling column having the equivalent of about 35–40 theoretical plates and a reflux ratio of 2:1. The kettle charge employed was 29.44 lbs.

| Cut Designation | Temp., °F. | Wt., lb. | Analysis, wt. percent ||||| 
|---|---|---|---|---|---|---|---|
| | | | Isobutylene | Di-isobutylene | t-butyl acetate | t-butyl alcohol | acetic acid |
| Light ends | | | 98.4 | 0.2 | 1.0 | 0.2 | 0.1 |
| 1 | 170-185 | 0.08 | 1.2 | 31.8 | 26.3 | 40.1 | 0.05 |
| 2 | 185-201 | 0.16 | 1.2 | 32.3 | 50.8 | 15.4 | 0.01 |
| 3-1 | 201 | 1.65 | 1.2 | 34.1 | 60.4 | 4.3 | |
| 3-2 | 202 | 1.71 | 1.1 | 19.5 | 78.1 | 1.3 | 0 |
| 3-3 | 204 | 1.78 | 1.1 | 4.7 | 93.6 | 0.6 | 0.01 |
| 3-4 | 204 | 1.50 | 1.7 | 0.8 | 97.4 | 0.1 | 0 |
| 4-1 | 205 | 1.79 | 1.3 | 0.2 | 98.3 | 0.2 | 0.01 |
| 4-2 | 206 | 1.77 | 1.9 | 0.1 | 98.0 | | 0 |
| 4-3 | 206 | 1.78 | 2.0 | | 98.0 | | 0 |
| 4-4 | 206 | 1.67 | 1.8 | | 98.2 | | 98.3 |
| Residue | | 1.56 | | 0.2 | 1.3 | | |
| Light ends | | 3.38 | 99 | | 1.0 | | |

*Example 10.*—Preparation of tertiary butyl alcohol as an appreciable co-product with tertiary butyl acetate is shown in the following run. The catalyst used was the same kind as that used in Example 4. A mixture of 2 mols of isobutylene per mol of acetic acid was charged at the rate of 113.5 grams per hour (1.35 v./v./hr./space velocity) into the reactor, the reactor pressure being 250 p.s.i.g. and the catalyst bed temperature 125° F. The mixture contained a small amount of water. At the end of the run 15.7% of the isobutylene charge had been converted to other products. The molal yield of tertiary butyl acetate based on acetic acid charged was 22.4%. On an acetic acid-free and isobutylene-free basis the product had the following composition: 90.4 weight percent tertiary butyl acetate, 6.4 weight percent tertiary butyl alcohol, and 3.2 weight percent di-isobutylene.

*Example 11.*—In this run the reactants were charged in the same mol ratio as in Example 1, the hydrocarbon feed being isobutylene and the carboxylic acid feed being propionic acid. The rate of the mixed feed was 40.4 grams per hour, giving a liquid space velocity of 0.5 v./v./hr. The catalyst used was 71 grams of a silica-alumina cracking catalyst containing 24.3% alumina in the form of 5/32" pellets which had been calcined at 1000° F. before use. The catalyst bed temperature was maintained at 180° F. and the reactor pressure at 250 p.s.i.g. In a 12-hour onstream period 350 grams of residual liquid product and 121 grams of condensed light ends (isobutylene) were collected. The molal yield of tertiary butyl propionate was 52.4%, and the weight ratio thereof to butylene dimer was 26.

*Example 12.*—In this run the reactants were charged in the same mol ratio as in Example 1, the hydrocarbon feed being 2-methyl butene-1 and the carboxylic acid feed being glacial acetic acid. The feed rate was 43.9 grams per hour (0.5 v./v./hr. liquid space velocity). The catalyst used was the same kind as that used in Example 11. The catalyst temperature was 180° F., and the pressure was 250 p.s.i.g. In an 8-hour onstream period 351 grams of residual liquid product and 7 grams of condensed light ends were collected. The molal yield of tertiary amyl acetate was 13.4%, and the formation of olefin dimer was negligible.

*Example 13.*—The following table summarizes the results in preparing tertiary butyl acetate from isobutylene and acetic acid over a co-precipitated magnesia-alumina-silica catalyst having the approximate assay of 15% magnesia, 8% alumina, and the balance silica.

The isobutylene conversion is computed as 100 times the quantity of isobutylene converted into ester, alcohol, and polymer products divided by the total quantity of isobutylene charged to the reactor. The catalyst selectivity is computed as 100 times the quantity of isobutylene converted into tertiary butyl acetate divided by the total quantity of isobutylene converted into all products, i.e., ester, alcohol, and polymer. The ester yield is computed as it was in all the foregoing examples, namely, 100 times the quotient of the amount of tertiary ester actually produced divided by that amount of the tertiary ester stoichiometrically equivalent to the quantity of carboxylic acid reactant fed.

The operations represented by the table below were run with a liquid space velocity of 0.5 v./v./hr. using a feed ratio of 2.0 mols of isobutylene per mol of acetic acid at a pressure of 250 p.s.i.g.

| Catalyst Temp., °F. | Isobutylene Conversion, Percent || Catalyst Selectivity, Percent || Ester Yield, Percent ||
|---|---|---|---|---|---|---|
| | 10 hrs. | 25 hrs. | 10 hrs. | 25 hrs. | 10 hrs. | 25 hrs. |
| 125 | 15 | 14 | 90 | 97 | 23 | 23 |
| 150 | 26 | 26 | 86 | 100 | 42 | 48 |

We claim:

1. In a process for the condensation of a tertiary olefin with a carboxylic acid to form the corresponding ester in a reaction zone, the improvement which comprises: contacting said reactants in the liquid phase at a temperature not above about 300° F. and in the presence of a Period 3 polyvalent metal silicate catalyst which is substantially free from fugitive acid and consists essentially of 5 to 50 weight percent Period 3 polyvalent metal oxide and 50 to 95 weight percent silica.

2. The process of claim 1 wherein said silicate catalyst is a synthetic one.

3. The process of claim 2 wherein the temperature is 100–250° F.

4. The process of claim 1 wherein said catalyst contains 0.1 to 20 weight percent refractory oxide selected from the group consisting of boria, titania, zirconia, hafnia, thoria, iron oxide and mixtures thereof.

5. The process of claim 1 wherein said silicate catalyst is a naturally-occurring one.

6. The process of claim 5 wherein the temperature is 70–250° F.

7. The process of claim 1 wherein said Period 3 polyvalent metal is aluminum.

8. The process of claim 1 wherein said Period 3 polyvalent metal is magnesium.

9. The process of claim 1 wherein part of said Period 3 polyvalent metal is aluminum and part is magnesium.

10. The process of claim 1 wherein the olefinic reactant is used in stoichiometric excess of the carboxylic acid for forming the ester.

11. The process of claim 1 wherein the reactants comprise isobutylene and acetic acid, and the product contains tertiary butyl acetate.

12. The process of claim 1 wherein the reactants comprise 2-methyl-1-butene and acetic acid, and the product contains tertiary amyl acetate.

13. In a process for treating a hydrocarbon stream containing a tertiary olefin, the improvement which comprises contacting said stream in a reaction zone in the liquid phase with a hydrocarbyl carboxylic acid at a temperature not above about 300° F. and in the presence of a silicate catalyst of a Period 3 polyvalent metal, which is substantially free from fugitive acid and consists essentially of 5 to 50 weight percent Period 3 polyvalent metal oxide and 50 to 95 weight percent silica thereby making a tertiary ester of said tertiary olefin and said carboxylic acid, withdrawing said ester and unreacted hydrocarbon from said reaction zone, and separating the withdrawn ester from the withdrawn unreacted hydrocarbon.

14. The process of claim 13 wherein said silicate catalyst is an alumina-silicate catalyst containing 9 to 25 weight percent alumina and 75 to 91 weight percent silica.

15. The process of claim 13 wherein said silicate catalyst is a magnesia-silicate catalyst and containing 20 to 30 weight percent magnesia and 70 to 80 weight percent silica.

16. The process of claim 13 in which said tertiary olefin is an aliphatic monoolefin containing 4–12 carbon atoms.

17. Method for the production of tertiary butyl esters of lower alkanoic acids which comprises reacting isobutylene with a concentrated lower alkanoic acid in the presence of a solid nonacid esterification catalyst consisting essentially of silica-magnesia, containing from about 10% to about 45% by weight of magnesia.

References Cited in the file of this patent

UNITED STATES PATENTS

| | | |
|---|---|---|
| 1,951,747 | Brezinski et al. | Mar. 20, 1934 |
| 2,006,734 | Edlund et al. | July 2, 1935 |
| 2,065,540 | Schneider | Dec. 29, 1936 |
| 2,174,985 | Lazier | Oct 3, 1939 |
| 2,525,145 | Mavity | Oct. 10, 1950 |
| 2,678,332 | Cottle | May 11, 1954 |